United States Patent [19]

Bopst, III

[11] 4,330,355

[45] May 18, 1982

[54] SYSTEM FOR CONTROLLED AND IMMEDIATE SEALING OF STRUCTURAL JOINTS AND PLASTER LINE CRACKS

[76] Inventor: John H. Bopst, III, 409 Chalfonte Dr., Baltimore, Md. 21228

[21] Appl. No.: 222,387

[22] Filed: Jan. 5, 1981

[51] Int. Cl.[3] .......................... B32B 31/18; B44C 7/00

[52] U.S. Cl. .................................... 156/361; 156/378; 156/523; 156/577; 156/579; 156/583.1

[58] Field of Search ............... 156/523, 526, 527, 574, 156/577, 579, 304.3, 361, 378

[56] References Cited

U.S. PATENT DOCUMENTS

| | | | |
|---|---|---|---|
| 3,547,740 | 12/1970 | Hinds | 156/523 |
| 3,677,865 | 7/1972 | Wagner | 156/577 |
| 3,871,940 | 3/1975 | Antonioni | 156/523 |
| 4,174,249 | 11/1979 | Bopst | 156/577 |

*Primary Examiner*—Michael G. Wityshyn

*Attorney, Agent, or Firm*—John F. McClellan, Sr.

[57] ABSTRACT

When manually propelled along a joint toward a barrier, as when manually propelled upward along a joint between wall panels this system covers the joint with heat-sealable metallic tape, heating the tape with an electric sole-plate, and by means of locking the tape-feed stops itself, preventing further propulsion, at exactly the right distance from the ceiling so that the tape when plunger-cut using a provision of the system will just extend to the ceiling and no more; cutting the tape releases the system so that it can be advanced by the ceiling to complete laying the terminal or cut end of the tape; this operation applies as well to traversing a ceiling joint or crack and laying tape right up to a wall; special collapsing sensor arm provisions and spool locking provisions co-act to produce the automatic measuring and tape laying; a graduated adjustment provides for calibration of the system.

15 Claims, 11 Drawing Figures

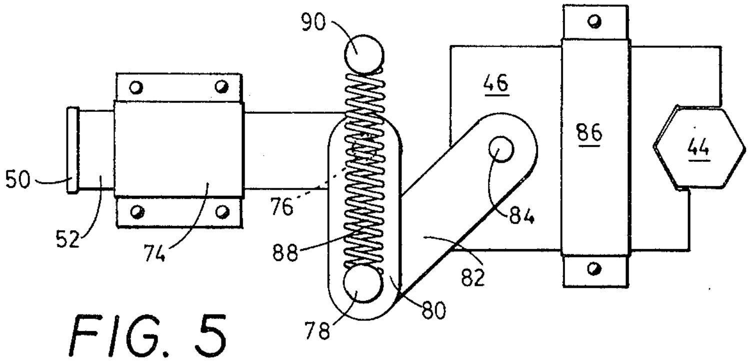
FIG. 5
FIG. 6
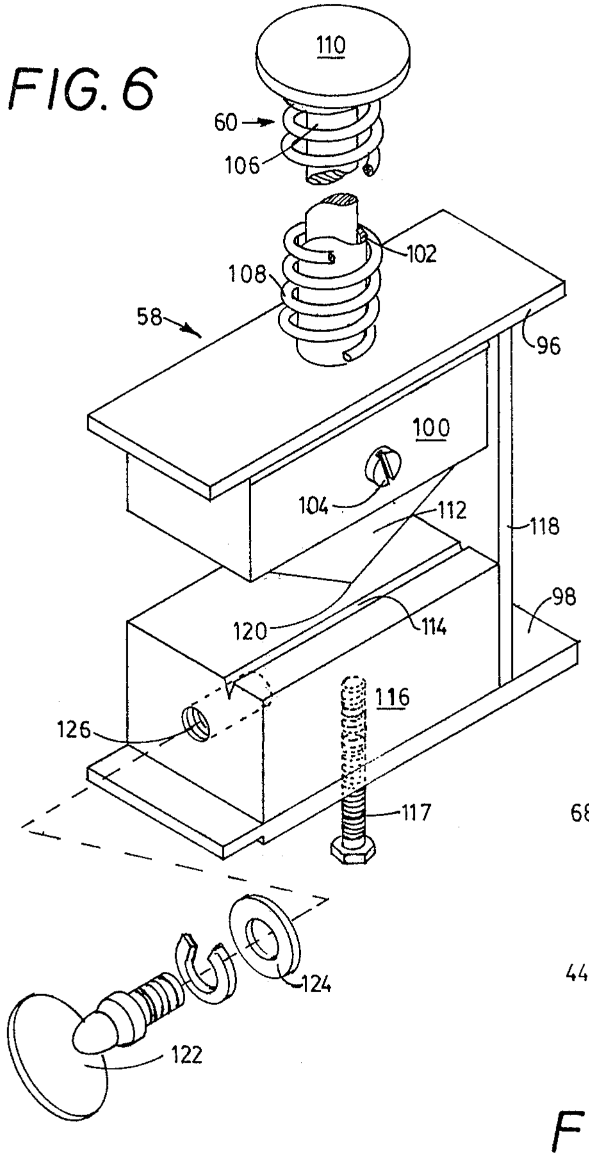
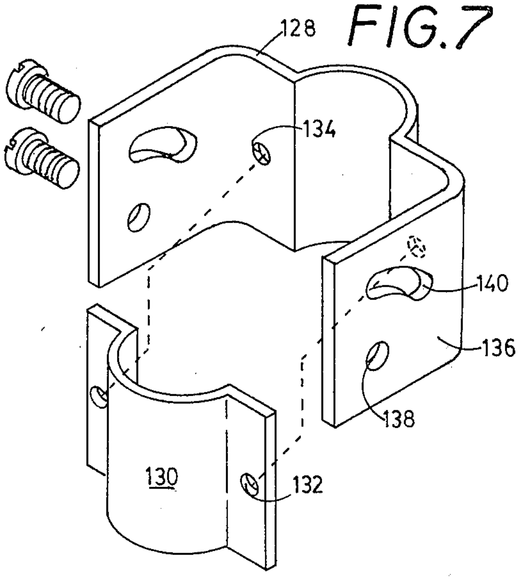
FIG. 7
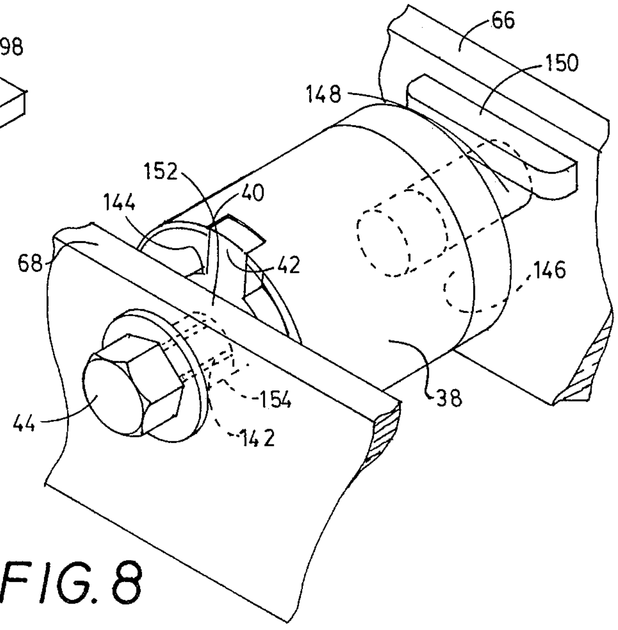
FIG. 8

FIG.9
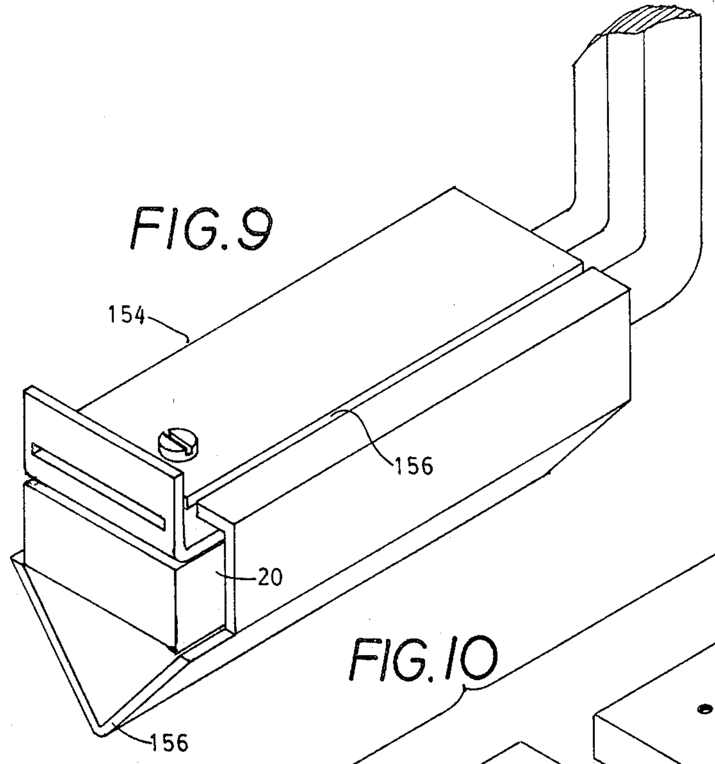
FIG.10
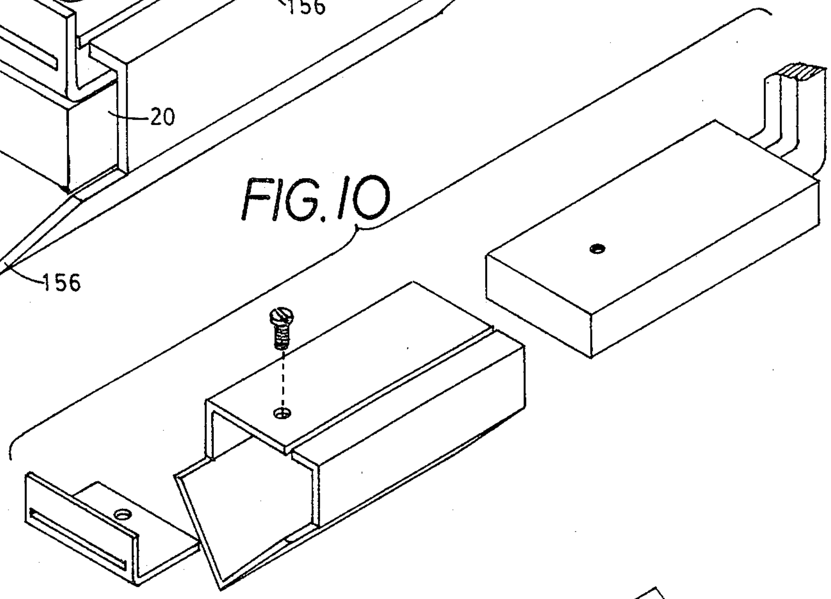
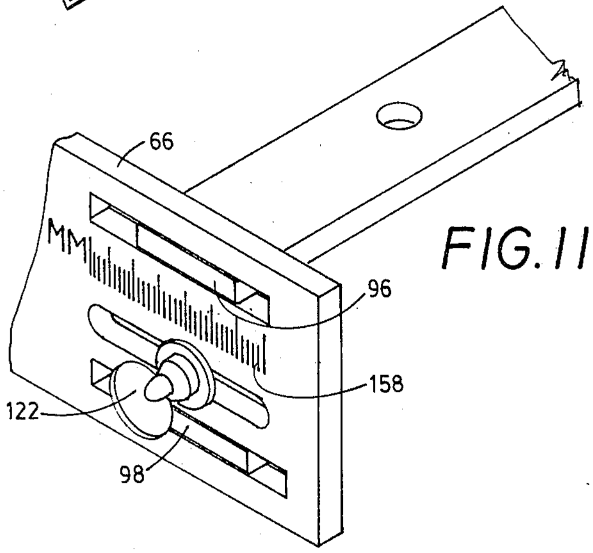
FIG.11

SYSTEM FOR CONTROLLED AND IMMEDIATE SEALING OF STRUCTURAL JOINTS AND PLASTER LINE CRACKS

Cross-reference is made to my co-pending applications for U.S. patent Ser. No. 93,678 filed Nov. 13, 1979 for ANGULAR ATTACHMENT FOR INSTANTANEOUS SEALING OF CRACKS, now Pat. No. 4,248,659, and Ser. No. 140,858, filed Apr. 16, 1980 for SYSTEM FOR CONTROLLING THE MOVEMENT AND LOCKING OF TAPE APPARATUS, now Pat. No. 4,295,921; the first of these teaches a sleeve attachment for use with the apparatus of my U.S. Pat. No. 4,174,249, and the second of these teaches a tape spool drive and lock structure. These are incorporated for showings herein.

This invention has to do with the sealing of narrow openings such as joints formed in drywall structures and the sealing of cracks that can develop in both drywall and plastered structures. A principal object is to provide a system for such that is much faster and much more economical than presently available systems.

My invention provides immediate, controlled and permanent sealing of wall joints, and of cracks that may develop in wallboard or plastered walls. The immediacy is provided by hot-iron transfer to heat-sealable adhesive coated metallic foil which bonds permanently to any customary drywall or plaster and covers the joint or crack. The permanency is assured by the material strength of the metallic foil as compared to the paper type composition of drywall board, and the stretchability of foil over a joint or crack that may expand due to high or low temperature changes or structural movement.

Further objects of my apparatus will become evident from the following description, including the provision of compactness in the complete apparatus, the tape and system stoppage provided by the measurement or sensor arm and responsive locking device for the tape spool, and the adjustable tape cutting device.

The above and other objects and advantages of the invention will become more readily apparent from the following, including the Figures, in which like parts are referred to by like reference numerals:

FIG. 5 is an elevational detail of spool-locking mechanism of the apparatus;

FIG. 6 is a perspective detail of a tape cutting mechanism of the apparatus;

FIG. 7 is an exploded detail of a bracket;

FIG. 8 is a fragmentary perspective detail of a tape spool provision;

FIG. 9 is a perspective view of a heater assembly portion of the apparatus;

FIG. 10 is an exploded perspective view of the heater assembly portion; and

FIG. 11 is a fragmentary perspective detail of an adjustable setting for the spool-locking provision.

Figure 1:
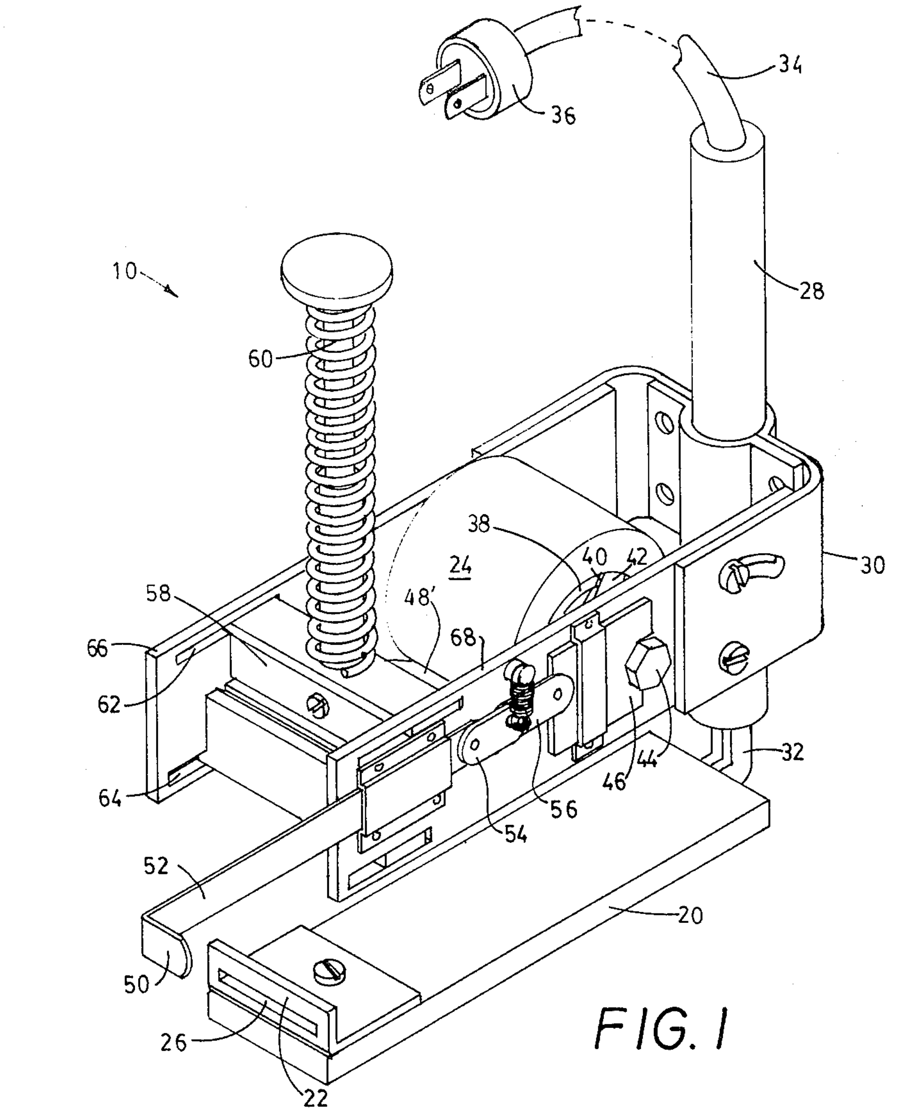
FIG. 1 is a perspective view of my apparatus.

FIG. 1 shows the invention in embodiment 10 as including certain elements from my U.S. Pat. No. 4,174,249 issued on Nov. 13, 1979 for SYSTEM FOR INSTANTANEOUS SEALING OF CRACKED LINES IN PLASTER.

EXISTING ART NOTES

These elements of my U.S. Pat. No. 4,174,249 include the electrically heated sole plate 20 with guide (inverted and different from guide 22 shown here) on the "upper front", in terms of the view, for thermoplastic tape when led from spool supply 24 through slot 26 in the guide and down and to the rear under the soleplate. Handle 28 carries the spool of tape by means of a bracket assembly somewhat like 30 and the soleplate by means of rigid armored and insulated electrical leads 32 which may be of the "Calrod" type used in stove elements, and mounts the flexible cord 34 and plug 36 through which in conventional manner electricity is conducted through the soleplate.

In operation these parts described comprise an assembly for "ironing-on" thermoplastic tape to cover wall and ceiling joints and cracks.

Further features in the combination of the present invention, which I have previously disclosed by me in my said Application Ser. No. 140,858, are the spool 38 with notch 40 engaged by dog 42 to spindle integral with a protrusive hex head 44 lockable in rotation by a sliding plate, but the sliding plate had a different cutout or engaging contour from that of locking plate 46 shown here. Additionally, as shown in later Figures the "V" shaped sleeve for use over the sole plate was disclosed by me in my said Application Ser. No. 93,678.

However, a problem has been how to assure the tape to proper length for the cut-end to abut exactly against a wall element, such as the ceiling when the tape-laying path is up along a wall, or such as a wall when the tape laying path is across a ceiling.

The coacting additional means described below accomplish this.

COACTIVE ADDITIONAL PROVISIONS; OPERATION

These provisions are described in reference to operation of the invention. In operation, the invention is manually directed along a joint (or crack) progressively deploying or laying a length of tape 48 and heat sealing it in place over the joint until the forward end 50 of sensor arm 52 encounters panel structure or wall element (a ceiling or a wall upstanding in the tape-laying path).

As result, the sensor arm 52 thrusts locking plate 46 to the rear where it engages and grips the hex head 44 of the spindle carrying the spool 24 of tape and locks the axle or spindle fixed to the spool of tape, automatically stopping the system. The sensor arm collapses at spring-biased foldable link structure 54, 56, still locking the tape, to provide for resumed advance of the system after the tape is cut. Locking the spindle of the spool 24 prevents rotation of the spool, which, as noted, is keyed to the spindle by means of the dogs, 42, shown, the dogs engaging the notches 40 indicated, in the spool. The inner end of the tape is fixed to the spool, as by cement or staple.

Preventing rotation of the spool 24, as noted, halts progress of the system 10 along the tape-laying path because of adherence of tape to the wall-element being taped and run of tape drawing tight from spool to surface being taped.

The run 48′ of tape through the invention from spool 24 to guide 22 passes through a cutter assembly 58 manually actuated by a plunger 60. Guide 22 is flush with the front end of the soleplate and extends forwardly beyond any other part except the sensor arm end 50. Slot 26 is at the junction of the soleplate with the upright part of the "L" shaped guide.

So, to cut the exact length of tape needed to complete the distance to the wall encountered by the end 50 of the sensor arm, the operator simply waits until the system 10 stops itself automatically and then pushes spring-returned plunger 60 to sever the tape at the cutter assembly 58. Severing the tape releases the system 10 from constraint by the spool. The tape forward of the severed end then is laid.

To lay the tape forward of the severed end, the operator merely pushes the system 10 against the wall in the tape laying path.

To reset the system for another run along a joint or crack the operator merely pulls out the sensor arm 52 to the forward direction and pulls a fresh length of tape through the guide and over the soleplate. The system is then ready for running up a wall or across a ceiling.

Adjustment details and sensor-arm-collapse details are given in reference to later Figures, but the cutter assembly 58 is adjustable back-and-forth in slots 62, 64 in the side plates 66, 68 which secure to the handle, and the angle of securance of the side plates is adjustable relative to the handle, in the plane of the handle.

Handle 28 and plunger 60 can be of any length desired; for example they can be of a length permitting application of tape to an average height or even higher ceiling by any user standing on a floor below the ceiling.

Figure 2:
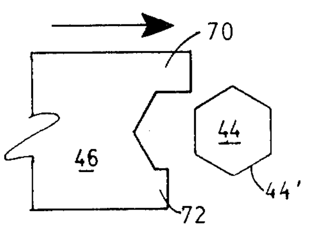
FIGS. 2, 3 and 4 are successive-position fragmentary elevational details of a spool locking provision.
Figure 3:
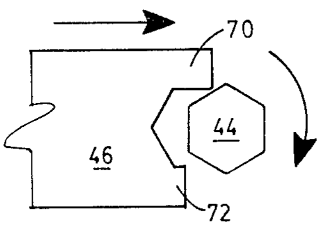
Figure 4:
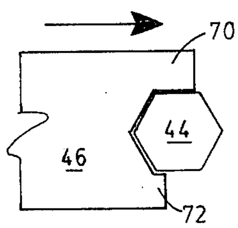

FIGS. 2, 3 and 4 show successive positions in the locking motion (arrows) of the locking plate 46 relative to the hex-head 44 of the spindle of the spool of tape. The locking plate has a hex-fitting cutout in the rear end.

Upper jaw 70 of the hex-fitting cutout shape of the locking plate is longer than lower jaw 72. Assuming the case in which the facets 44' of the box head are out-of-plane with the locking plate cutout shape (FIG. 2) the upper jaw 70 will contact first and rotate the hex head (FIG. 3) to a position in which it can be locked by grip of both the upper jaw and the lower jaw 72 (FIG. 4).

It will be appreciated that other regular polygonal spindle-head shapes can be used. The hex configuration assures accuracy to 1/6 turn; using the principle far smaller increments are attainable.

FIG. 5 shows how the sensor arm 52 passes through guide 74 and a double-serial-link connection through pivots 76, 78 to pivotal links 80, 82, and from link 82 to pivotal connection at 84 with the locking plate 46, which reciprocates, like the sensor arm, in a second guide 86. Normally tension spring 88, mounted between a pin 90 in the frame or side plate 68 and pivot 78, holds the links nearly co-linear with the sensor arm and locking plate. Pin 90 is fixed in position such that it prevents the links from reaching dead center when straightened, by restraining link 80, 82 through the compressed length of spring 88, so that with sufficient force on the sensor arm forward end 50 to overcome the spring tension the links 80, 82 will hinge downward to the position shown, effectively collapsing the sensor arm. This pin 90 also limits outward travel of the sensor arm assembly through contact with element 46. 74 can have an open bottom at the rear.

FIG. 6 shows that for adjusting the tape cutting means for cutting at a selected place along a tape the cutter assembly 58 comprises upper and lower slides 96, 98 which slidably engage corresponding slots (62, 64, FIG. 1 on the side 66 of the bracket assembly). A first block 100 is fixed to the upper slide and by means of a guide tube 102 fixed by screw 104 centrally and vertically through the block, slidably carries shank 106 of plunger 60. The plunger shank has a conventional compression-spring 108 for return, and on the upper end a disk 110 for comfortable manual pressing, and on the lower end a downward "V"-shaped guillotine blade 112. The blade fits into and in cutting coacts with a blade receiving slot or groove 114 in a second block 116 held in vertically spaced relation from the first block by end pieces connecting the blocks, 118 shown.

The guillotine point or apex 120 is very important to the invention because metallic tape, which the invention is designed to dispense, is difficult to cut smoothly and symmetrically, but the point makes cutting it practical by piercing the tape at the center and spreading the cut both ways from the center.

Thumbscrew 122, lock washers 124, and threaded hole 126 in the lower block 116 provide for adjustably fixing the fore and aft position of this subassembly relative to the sideplates, as will be described later. For 117 see last page.

FIG. 7 shows that the handle gripping portion of the bracket assembly is very simple yet strong and adjustable, comprising two members 128, 130 with facing cylindrically concave handle fitting shape and screw holes 132, 134 to compress these on the handle. Nuts go on the inside.

Member 128 is generally "U"-shaped, and has on each arm 136 of the "U"-shape a pivot hole 138 and above this an arcuate slot 140, permitting the side plate (66, 68, FIG. 1) of the frame to be held in pivotal adjustment by conventional nut and screw attachment. This permits adjustment of angle of handle and soleplate relative to sideplates, which carry the tape storage and cutting means, when desired for optimizing tape run or handling characteristics.

FIG. 8 details the relation of the frame side plates 66, 68 to the spool 38 and the spindle 142. Hex head 44 of the spindle is integral with the axial screw-shank 142 which force-fits to or nut-locks to or otherwise conventionally affixes adjustably to dog-plate 144, which has dogs 42 shown engaging respective spool notches 40; a similar plate dog 146 on the far end has an integral axle 148 journaled in side plate 66. Flange 150 provides thrust location and useful frictional retardation of the spool in opposition to compression spring 152, the axial thrust of which is adjustable by rotating the threaded spindle 142 in member 144. See prior applications.

FIGS. 9 and 10 show the previously mentioned and previously disclosed "V" section sleeve 154 which fits over the sole plate 20. This permits sealing tape in corner locations, the apex of the "V"-section fitting in the corner.

A new feature shown in member 154 is the top longitudinal separation 156 of the sleeve, providing for closer fit to the soleplate by spring action, and for more even resilient operation in applying tape in irregular corners.

FIG. 11 is a fragmentary detail showing the respective relations of the first or upper slide 96 and of the second or lower slide 98 of the cutter subassembly to side plate 66 and locking thumbscrew 122 which threads into the lower block as described above and moves in slot.

A graduated strip or scale 158 which may have inch or metric divisions or both on separate scales, permits resetting the fore-and-aft or longitudinal position of the cutting subassembly by a known amount, adjusting the length of the tape forward of the knife to match the extension of the sensor arm and to compensate for differences in sensing by the sensor arm caused by different wall-element inclinations and similar factors.

In FIG. 6, reference numeral 117 denotes a prop screw threaded into the bottom center of lower slide 98 and lower block 116 for adjustably bearing on the top of sole plate 20, FIG. 1, to help maintain adjustment selected at 140, FIG. 7.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system for sealing narrow openings such as joints between panel structures, cracks and the like, in drywall, plaster and the like building walls and ceilings and having: a soleplate with heat means and a guide for deploying tape along a tape laying path on a first said panel structure while being heated by the soleplate, a handle on the soleplate, and storage means on the system for a supply of tape, the improvement comprising in combination: means for assuring cutting of tape to proper length to abut a second said panel structure upright with respect to the first said panel structure, when approached in said tape laying path, including means on the system for sensing said approach, the means for assuring including means on the system for automatically stopping said system at a proper position in said approach for said tape cutting comprising means for stopping the tape supply and causing tape deployed on said surface to draw the system to a halt.

2. In a system for sealing narrow openings such as joints between panel structures, cracks and the like, in drywall, plaster and the like building walls and ceilings and having: a soleplate with heat means and a guide for deploying tape along a tape laying path on a first said panel structure while being heated by the soleplate, a handle on the soleplate, and storage means on the system for a supply of tape, the improvement comprising in combination: means for assuring cutting of tape to proper length to abut a second said panel structure upright with respect to the first said panel structure, when approached in said tape laying path, including means on the system for sensing said approach, the means for assuring including means on the system for automatically stopping said system at a proper position in said approach for said tape cutting comprising means for stopping the tape supply and causing tape deployed on said surface to draw the system to a halt, the tape storage means comprising a spool, the automatic stopping means including means for automatically locking the spool and causing tape deployed on said surface to draw the spool, and therefore said system, to a halt.

3. In a system as recited in claim 2, spool engaging means, the means for automatically locking the spool including a sensor arm extending forwardly in the tape laying path and having connection, upon contact with a said second panel structure, for actuating the spool engaging means.

4. In a system as recited in claim 3, the spool engaging means including an axle fixed relative to the spool, a portion of the axle shaped for being gripped, and means for gripping the spool in response to said actuation.

5. In a system as recited in claim 3, said connection for actuating the spool engaging means including means permitting resumption of travel of the system along the tape laying path following tape cutting, for producing said abutting.

6. In a system as recited in claim 5, the means permitting resumption of travel including said connection comprising a spring-biased foldable link structure between the sensor arm and the spool engaging means.

7. In a system as recited in claim 3, tape cutting means comprising a plunger with a blade and a member opposed to the blade.

8. In a system as recited in claim 7, the blade having a "V" shape with the apex of the "V" shape central of the blade.

9. In a system as recited in claim 8, the member opposed to the blade having a blade-receiving slot therein.

10. In a system as recited in claim 7, and means for adjusting the tape cutting means for cutting at a selected place along a tape.

11. In a system as recited in claim 10, the means for adjusting including a scale.

12. In a system as recited in claim 3, tape cutting means, and means adjustably supporting the soleplate relative to the tape storage means and the tape cutting means.

13. In a system as recited in claim 12, the adjustable supporting means including a pivotal bracket at the handle, a pair of arms supported by the pivotal bracket, and said tape cutting means and tape storage means held by said pair of arms.

14. In a system as recited in claim 3, a sleeve with a slot along the length thereof, on the soleplate for resiliently engaging corners between wall panel structures.

15. In a system as recited in claim 3, the guide being upright above the forward end of the soleplate and having a slot therein at the soleplate.

* * * * *